(12) United States Patent
Kornienko et al.

(10) Patent No.: US 11,270,412 B2
(45) Date of Patent: Mar. 8, 2022

(54) IMAGE SIGNAL PROCESSOR, METHOD, AND SYSTEM FOR ENVIRONMENTAL MAPPING

(71) Applicants: Apical Limited, Cambridge (GB); Arm Limited, Cambridge (GB)

(72) Inventors: Alexey Kornienko, Loughborough (GB); Maxim Novikov, Loughborough (GB); Thomas James Cooksey, Cambridge (GB); Jinhui He, Shanghai (CN)

(73) Assignees: Apical Limited, Cambridge (GB); Arm Limited, Cambridge (GB)

( * ) Notice: Subject to any disclaimer, the term of this patent is extended or adjusted under 35 U.S.C. 154(b) by 153 days.

(21) Appl. No.: 16/670,344

(22) Filed: Oct. 31, 2019

(65) Prior Publication Data

US 2021/0133922 A1  May 6, 2021

(51) Int. Cl.

| | |
|---|---|
| *G06K 9/00* | (2006.01) |
| *G06T 3/40* | (2006.01) |
| *G06F 9/54* | (2006.01) |
| *G06T 1/00* | (2006.01) |
| *G06T 9/00* | (2006.01) |

(52) U.S. Cl.
CPC ............ *G06T 3/4007* (2013.01); *G06F 9/544* (2013.01); *G06T 1/0007* (2013.01); *G06T 9/00* (2013.01)

(58) Field of Classification Search
CPC ........ H04N 7/50; H04N 7/30; H04N 7/26313; H04N 7/26106; H04N 7/26244; H04N 7/26335; H04N 7/26271; H04N 19/182; H04N 19/436; H04N 19/115; H04N 19/176; G06T 3/4007; G06T 9/00; G06T 1/0007; G06F 9/544
See application file for complete search history.

(56) References Cited

U.S. PATENT DOCUMENTS

| | | | | |
|---|---|---|---|---|
| 7,421,134 | B2* | 9/2008 | Hashimoto | G08B 13/19667 341/51 |
| 7,542,613 | B2* | 6/2009 | Fujiyama | H04N 19/139 382/103 |
| 10,095,933 | B2* | 10/2018 | Sherry | H04N 21/6587 |
| 10,728,474 | B2* | 7/2020 | Douady | H04N 5/2258 |
| 10,970,552 | B2* | 4/2021 | Leroy | H04N 9/735 |
| 2004/0179110 | A1* | 9/2004 | Hashimoto | H04N 19/17 348/222.1 |
| 2006/0062480 | A1* | 3/2006 | Fujiyama | H04N 19/137 382/232 |
| 2016/0234514 | A1* | 8/2016 | Ju | H04N 19/85 |
| 2019/0356873 | A1* | 11/2019 | Douady-Pleven | H01L 27/14623 |
| 2020/0034993 | A1* | 1/2020 | Croxford | G02B 27/017 |
| 2020/0336729 | A1* | 10/2020 | Hsieh | H04N 13/25 |
| 2021/0133922 | A1* | 5/2021 | Kornienko | G06T 9/00 |

* cited by examiner

*Primary Examiner* — Amir Alavi
(74) *Attorney, Agent, or Firm* — EIP US LLP

(57) ABSTRACT

An image signal processor, comprising an input module for obtaining input data from a camera, whereby the camera is arranged to capture a representation of a real-world environment. The image signal processor further comprises at least one adjustment module for compressing the input data and producing compressed input data, and a localization and mapping module arranged to generate one or more data points from the compressed input data. The image signal processor also comprises an output module for outputting at least the one or more data points.

19 Claims, 4 Drawing Sheets

IMAGE SIGNAL PROCESSOR, METHOD, AND SYSTEM FOR ENVIRONMENTAL MAPPING

BACKGROUND OF THE INVENTION

Field of the Invention

The present invention relates to image signal processors, methods and systems for environmental mapping.

Description of the Related Technology

It is known to provide computing devices with inertial sensors, such as inertial measurement units (IMUs), for the purpose of detecting the orientation of a device. An output from an IMU may be used for virtual reality (VR) and/or augmented reality (AR) applications, to detect changes in orientation of the device. This allows a computing device to provide the user with a display of a virtual environment which is altered in response to detected changes in orientation. Detecting changes in the orientation of the device, which may be referred to as sensing of orientational motion, thus allowing the user to control their view of the virtual environment.

It is desirable to allow a computing device to detect not just changes in the device's orientation but also changes in the device's position, which may be referred to as sensing of positional motion. A user may then move positionally through a virtual environment by real-world positional motion rather than through less natural user input via a control interface.

A challenge is to detect a device's position with any accuracy and/or frequency sufficient for various applications, whilst conserving computing resources and/or power. This challenge is increased for AR and VR applications, due to the considerable demands of AR and VR environment generation and image rendering. It is a particular challenge for AR and VR applications which execute on mobile computing devices, such as general-purpose smartphones and general-purpose tablet computing devices, which have relatively small amounts of available computing resources and/or power.

SUMMARY

According to a first aspect of the present disclosure there, is provided an image signal processor, comprising an input module for obtaining input data from a camera, the camera arranged to capture a representation of a real-world environment; at least one adjustment module for compressing the input data and producing compressed input data; a localization and mapping module arranged to generate one or more data points from the compressed input data; and an output module for outputting at least the one or more data points.

According to a second aspect of the present disclosure, there is provided a method for localization and mapping of a real-world environment, the method comprising the steps of obtaining input data from a camera, the camera arranged to capture a representation of the real-world environment; compressing the input data to produce compressed input data; generating one or more data points from the compressed input data; and outputting at least the one or more data points.

According to a third aspect of the present disclosure, there is provided a system comprising a camera for capturing a representation of a real-world environment; an image signal processor according to claim 1 arranged to receive the representation from the camera and generate one or more data points; and a processor.

BRIEF DESCRIPTION OF THE DRAWINGS

Further features and advantages will become apparent from the following description of preferred embodiments, given by way of example only, which is made with reference to the accompanying drawings in which like reference numerals are used to denote like features.

DETAILED DESCRIPTION OF CERTAIN INVENTIVE EMBODIMENTS

Details of image processors, systems and methods according to examples will become apparent from the following description with reference to the Figures. In this description for the purposes of explanation, numerous specific details of certain examples are set forth. References in the specification to 'an example' or similar language means that a feature, structure, or characteristic described in connection with the example is included in at least that one example, but not necessarily in other examples. It should be further noted that certain examples are described schematically with certain features omitted and/or necessarily simplified for the ease of explanation and understanding of the concepts underlying the examples.

Simultaneous localization and mapping is the computational problem of constructing or updating a map of an unknown real-world environment while simultaneously keeping track of a device's location within it. Simultaneous location and mapping implementations rely on a number of sensors arranged to receive inputs related to a real-world environment. These inputs are processed by one or more processors to detect a plurality of data points within the sensor information and track them over time. In some examples, simultaneous localization and mapping can be used to predict the location of previously detected key points as well as obtain metadata about data points. Such detection and tracking require considerable computing resources, such as memory and processing time. Much of the computing resource is taken by reading and writing sensor information to memory. So that it may be read and processed by the one or more processors.

Figure 1:
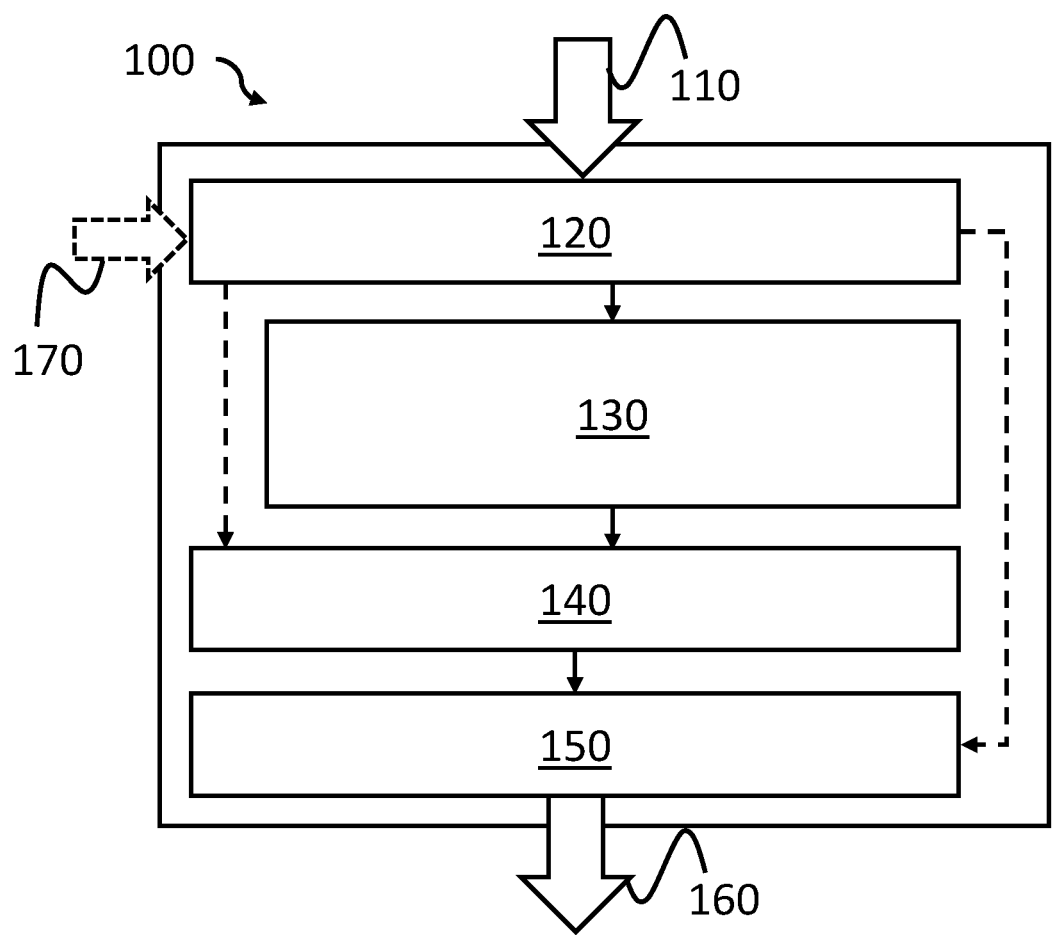
FIG. 1 shows schematically an image signal processor according to a first example.

Image signal processors (ISPs) are used to process sensor image data using computer algorithms. The sensor image data is obtained by a sensor which detects photons of a real-world scene. The sensor data is then processed by the ISP to recover image data which matches the real-world scene. The sensor data can be further processed by the ISP by applying one or more algorithms, these algorithms change the quality of an image so that it is suitable for viewing by a human or computer vision (CV) algorithm, where the image can be analysed to extract information. By undertaking processing within the ISP, such as the processing undertaken by simultaneous localization and mapping algorithms, efficiencies may be gained by removing the need to read and write the output of an ISP to memory before being processed by the separate simultaneous localization and mapping unit. FIG. 1 shows schematically an ISP 100 according to a first example. The ISP 100 is arranged to receive input data 110 from one or more sensors (not shown), the input data 110 is received at an input module 120. The input data 110 may be a visual data stream from a sensor. The sensor may detect the intensity of light, or other radiation, such as infra-red, coming from a real-world scene. The image data 110 is then generated from the detected intensity of the radiation at the various sensor pixels or points on the sensor. For example, where the sensor is a camera, the intensity of light at each of the pixels may be used to generate the image data 110. The image data 110 produced is dependent upon the properties of the sensor. In one example, the sensor has a colour filter array (CFA) which is used to detect the colour of the light coming from the real-world scene. The colour filter may be a Bayer filter, which is composed of a combination of 2×2 pixel arrays of red, green, green and blue filters. The use of the colour filter array produces sensor image data which is mosaicked as each colour pixel can only detect light of a certain colour. In another example, the sensor image data contains signal noises resulting from various stochastic physical processes and brightness levels in the scene can result in loss of information. The sensor is communicably coupled to the ISP 100 as will be described in further detail below in relation to FIG. 4. Whilst the invention is described in relation to an ISP 100 separate from one or more sensors (not shown), it will be appreciated that, in some examples, the invention may be embedded with the processing components associated with the sensor, in the same System on Chip (SoC). The input module 120 receives the stream of input data 110, for examples frames of image data from a visual data stream, which is passed to the compression module 130.

The compression module 130 is arranged to receive the stream of input data 110 from the input module 130 and scale or interpolate the input data 110 to reduce the size. This ensures that the amount of internal memory required by the ISP 100 is reduced. The compression module 130 is arranged to apply a scaler to the stream of input data 110. Such scalers may be applied to the stream of input data using hardware, and may for example sub-sample the input data 110. In such an example, a single pixel value may be read from memory in a first-in-first-out manner and averaged along with a plurality of previous pixel values. The compression module 130 is arranged to reduce the size of the input data 110 used to generate one or more descriptors as will be described below, therefore reducing the amount of internal memory required in the ISP 100. The compression may be performed in the frequency domain and/or using a wavelet transform.

The ISP 100 also comprises a localization and mapping module 140 for generating one or more data points, such as keypoint positions, key point detector responses, keypoint descriptors, tracking information for the key points and a matching score indicating a matching quality. The localization and mapping module 140 receives the compressed data stream from the compression module 130 and generates one or more data points based on the compressed data stream. By generating the one or more data points on the compressed data stream, instead of on the input data stream 110 received directly from the sensor, the amount of internal memory of the ISP 100 required by the localization and mapping module 140 is significantly reduced, whilst still providing a substantially similar result when compared to generating data points directly on the input data stream 110.

The ISP 100 comprises an output module 150 arranged to output, output data 160 comprising at least the one or more data points generated by the localization and mapping module 140. The output module 150 may be communicably connected to one or more processors (not shown) arranged to receive the output data 160.

In some examples, the one or more processors may be arranged to provide additional information 170, such as feedback data from other sensors and/or previous operations, to the ISP 100 via the input module 120. This additional information 170, may comprise predicted locations of previously detected key points, variance or other metadata associated for the predicted locations, specific points of interest being monitored, and/or additional metadata associated with the previously detected key points. The additional information 170 may be used to further refine the data points generated by the localization and mapping module 140. In some examples, this further information may be combined and/or compressed by the compression module 130 before being processed by the localization and mapping module 140.

In yet a further example, the output data 160 may comprise the raw input data stream 110 received from the camera along with the data points generated by the localization and mapping module 140 or in other embodiments, it may comprise processed image data, such as image data in different color spaces, for example, RGB, YUV, Luv or even greyscale.

In yet a further example, the ISP 100 may comprise a correction module (not shown) for correcting one or more deficiencies in the input data 110 and/or data points generated by the localization and mapping module 140. The correction module may be arranged to correct the one or more of the data points and/or image data in relation to, for example, lens distortions and/or rolling shutter mitigation. However, it will be appreciated that the correction module may be arranged to correct other errors and/or deficiencies in the input data 110 or data points.

Figure 2:
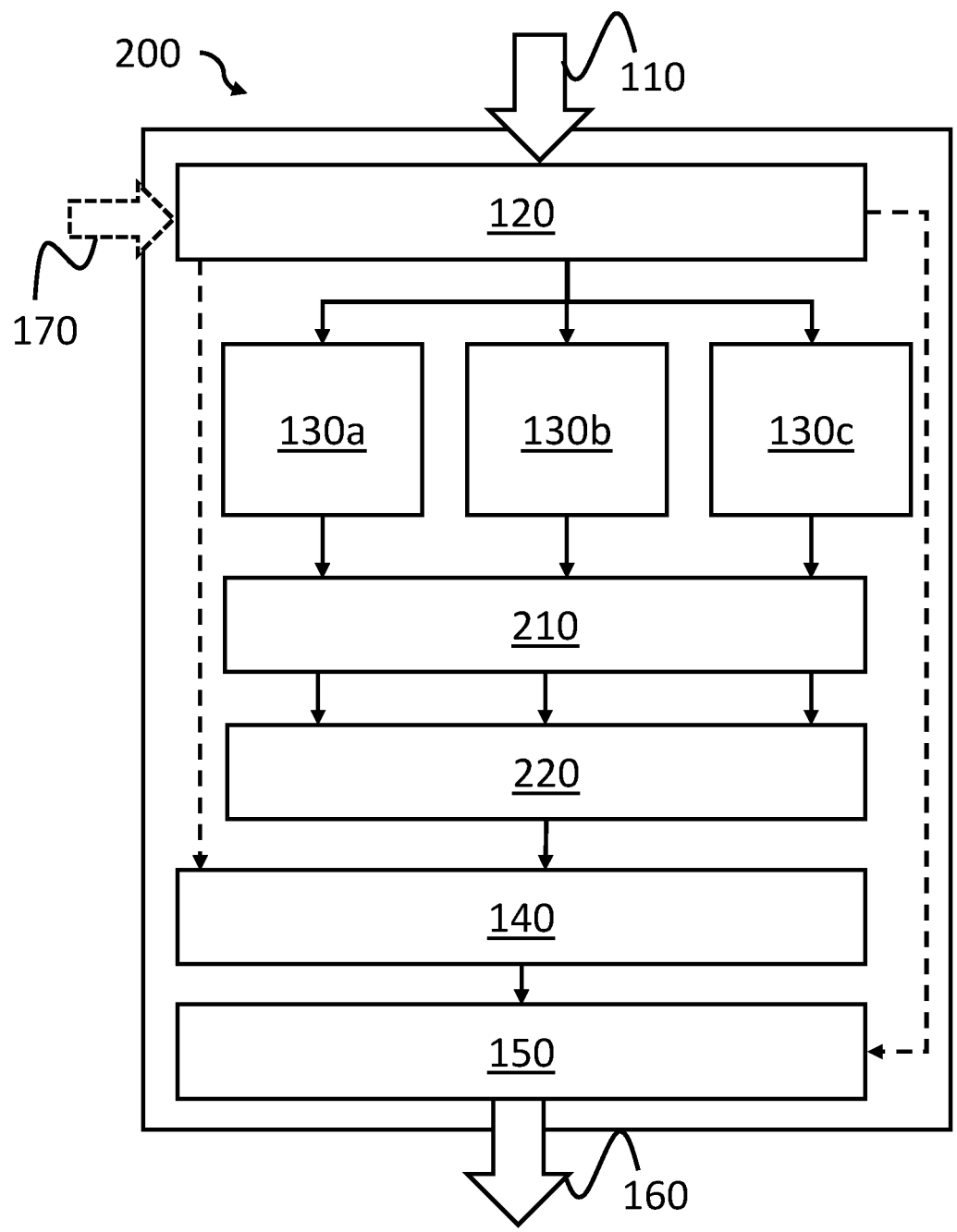
FIG. 2 shows schematically an image signal processor according to a second example.

FIG. 2 shows schematically an ISP 200 according to a second example. The ISP 200 comprises an input module 120 as in example ISP 100 shown in FIG. 1, the input module 120 is arranged to receive input data 110 from one or more sensors (not shown), such as a camera. The input data 110 may be received in the form of a stream of data from the sensor and may pass through a compression module 130 as described above in relation to FIG. 1. However, in example 200 of FIG. 2, the input data 110 may be processed by one or more compression modules 130a-130c, the one or more compression modules 130a-130c may be arranged to reduce the size of the input data 110 by each applying a scaler to the input data 110. Each scaler may scale the input data by a different amount, for example, compression module 130a may apply a scaler to the input data 110 which reduces the size of the input data 110 by a factor or two, this may be achieved by averaging every two bits received from the input module. Compression module 130b may reduce the size of the input data 110 by a factor of four by averaging every four bits of input data 110 for example, and compression module 130c may reduce the size of the input data 110 by a factor of eight by averaging every eight bits of input data 110. It will be appreciated that the compression modules 130a-130c may reduce the size of the input data 110 by other factors, and by other methods than those described above.

Since the input data 110 is received as a stream of data from the sensor, and due to the different scaling factors of the compression modules 130a-130c, where each compression module 130a-130c requires different amounts of the input data stream 110 in order to scale the input data 110 accordingly, it is necessary to delay/buffer the outputs of the compression modules 130a-130c which require less data, so that the data points are able to be determined on the same portion of input data 110. In such examples, the ISP 200 comprises a delay module 210. The delay module 210 may comprise a buffer and/or a number of delay lines associated with each of the compression modules 130a-130c, which are arranged to delay the outputs of the compression modules 130a-130c such that any data points generated are based on substantially the same portion of input data 110.

The ISP 200 also comprises a combination module 220 for combining the outputs of the one or more compression modules 130a-130c. The combination module 220 may, for examples, be arranged to average the output of one or more of the scalers 130a-130c, based on a particular portion of input data 110. Once combined, the output of the combination module 220 is used by a localization and mapping module 140 for generating one or more data points, such as keypoint positions, key point detector responses, keypoint descriptors, tracking information for the key points and a matching score indicating a matching quality. The localization and mapping module 140 receives the compressed and combined data stream from the combination module 220 and generates one or more data points based on the compressed data stream. By generating the one or more data points on the compressed data stream, instead of on the input data stream 110 received from the camera, the amount of internal memory required by the localization and mapping module 140 is significantly reduced, whilst still providing a substantially similar result when compared to generating data points on the input data stream 110.

The ISP 100 comprises an output module 150 arranged to output, output data 160 comprising at least the one or more data points generated by the localization and mapping module 140. The output module 150 may be communicably connected to one or more processors (not shown) arranged to receive the output data 160.

In some examples, the one or more processors may be arranged to provide additional information 170, such as feedback data from other sensors and/or previous operations, to the ISP 100 via the input module 120. This additional information 170, may comprise predicted locations of previously detected key points, variance or other metadata associated for the predicted locations, specific points of interest being monitored, and/or additional metadata associated with the previously detected key points. The additional information 170 may be used to further refine the data points generated by the localization and mapping module 140. In some examples, this further information may be combined and/or compressed by the compression module 130 before being processed by the localization and mapping module 140.

In yet a further example, the output data 160 may comprise the raw input data 110 received from the camera along with the data points generated by the localization and mapping module 140, or in other embodiments, it may comprise processed image data, such as image data in different color spaces, for example, RGB, YUV, Luv or even greyscale.

In yet a further example, the ISP 100 may comprise a correction module (not shown) for correcting one or more deficiencies in the input data 110 and/or data points generated by the localization and mapping module 140. The correction module may be arranged to correct the one or more of the data points and/or image data in relation to, for example, lens distortions and/or rolling shutter mitigation. However, it will be appreciated that the correction module may be arranged to correct other errors and/or deficiencies in the input data 110 or data points.

By generating the data points at the ISP 100, 200, there is no requirement for a separate processor to generate the data points, and as such, no requirement for the input data 110 to be stored in memory and read by a separate processor in order to generate the data points. This not only reduces the external memory required but also increases efficiency by reducing compute time by eliminating the need to read and write the input data to and from memory. In some examples, where the input data 110 is not required, for example where the sensor is a camera, and the device is not required to show the output of the camera, the input data 110 itself may never be written to external memory, further increasing efficiency. In yet a further example, the components of the ISP 100 described above may be integrated with the sensor itself on the same SoC, thereby further increasing efficiency.

Figure 3:
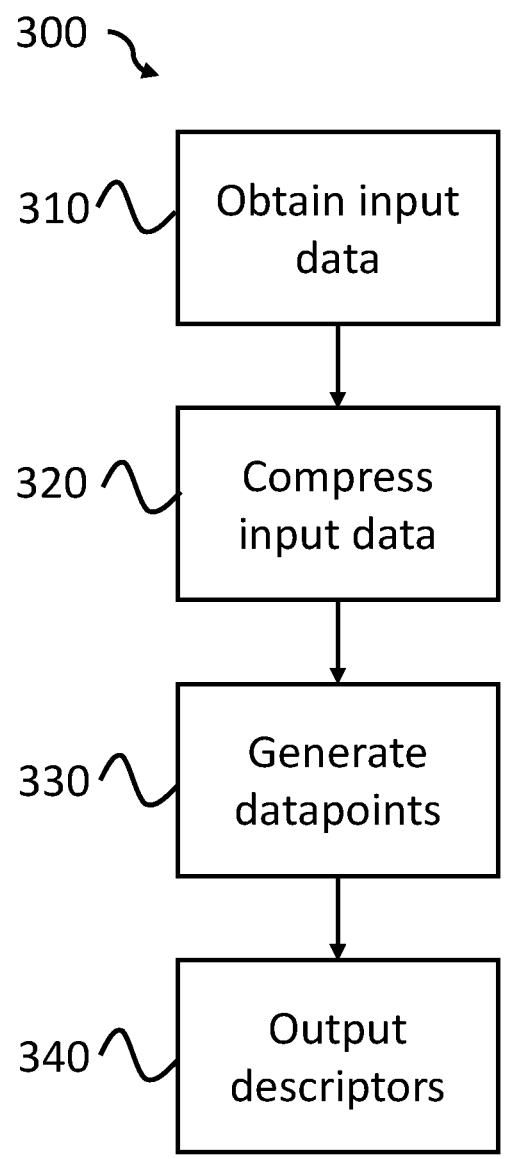
FIG. 3 is a flow diagram illustrating a method according to an example.

FIG. 3 is a flow diagram 300 illustrating a method for the localization and mapping of a real-world environment according to an example. At item 310 input data is obtained. The input data comprises at least camera data obtained from a camera associated with a system of the method as will be described below in relation to FIG. 4. The camera data may be received at an input module as a stream of visual data. The input data obtained may also include other feedback data received from one or more other components of the system. For example, the input data may also include one or more predicted locations of previously detected key points, a variance or other statistics for the one or more predicted locations, one or more points of interest, and metadata associated with one or more of the previously detected key points. Once the input data has been obtained the method progresses to item 320 where the input data is compressed.

At item 320, the input data is received from an input module of the ISP and is compressed. In some examples, only the input data 110 obtained from the sensors, such as a camera is compressed, whereas in other examples both the sensor data and feedback data obtained from one or more other processors may be compressed. Compressing the input data may comprise sampling the input data at one or more sampling rates to reduce the size of the data, and thereby reduce any internal memory requirements of the ISP. In some examples compressing the input data may comprise sampling the input data at a single sampling rate, in other examples compressing the input data may comprise sampling the input data at multiple different sampling rates. To adjust the input data, a scaler may be applied which reduces the size of the input data by a particular factor, for example by a factor or two. This may be achieved by averaging every two bits of input data received. Similarly, the size of the input data may be reduced by a factor of four by averaging every four bits of input data, and by a factor of eight by averaging every eight bits of input data 110. It will be appreciated that the input data may be compressed by other factors, and by other methods to reduce its size, over and above those examples described above.

A plurality of different compression rates may be used to compress the input data. In such an example, the output may be based on a combination of the different compression rates. Such different compression rates may be applied to different portions of the input data. For example, more detail may be required in the centre of the input data, and as such a lower compression rate may be used to retain more detail, whereas, towards the edges of the input data, a higher compression rate may be used since the detail at the edges is not as important. It will be appreciated that other examples of different compression rates may be used, based on the requirements of the system. When a plurality of different compression rates are used to adjust the input data, in some embodiments in order to combine the compressed data so as to generate the data points, some of the compressed input data must be delayed. This ensures that, when combining compressed input data where different sample rates have been applied, the combination of the compressed input data relates to the same range of input data. As such, where the input data is sampled by a factor of two, and where the input data is also sampled by a factor of four, the input data scaled by a factor of two must be delayed and/or buffered so that the same portion of input data may be used when combining. That is there will be two instances of compressed input data—when scaled by a factor of two—and one instance of compressed input data—when scaled by a factor of four—required when combining. The delay may be achieved using one or more delay lines, and/or a buffer. The combined data is then used to generate the data points. In some examples, the ISP may comprise one or more interpolation modules (not shown) to upscale or downscale the input data, enabling efficient generation of varying scaled version of the data.

Next, at item 340, data is output to one or more other components of a system, such as the system which will be described below in relation to FIG. 4. The data output may comprise solely the data points, or in some examples may also comprise one or more other data items, such as the input data received from a camera. This enables the ISP to output information based on system requirements, for example where the visual data is not required for use, it can be discarded and only the data points used in subsequent processing. By calculating such data points at the ISP, as described above in relation to FIGS. 1 and 2, the efficiency of the system may be improved as there is no requirement to first process and store the input data in memory, before a separate localization and mapping processor reads the data from memory and determines the one or more data points.

Once the input data has been compressed, the method proceeds to item 330, where one or more data points associated with the input data are generated. The one or more data points may comprise at least one key point position, a key point detector response, a key point descriptor, a motion vector associated with at least one key point and a matching score.

Figure 4:
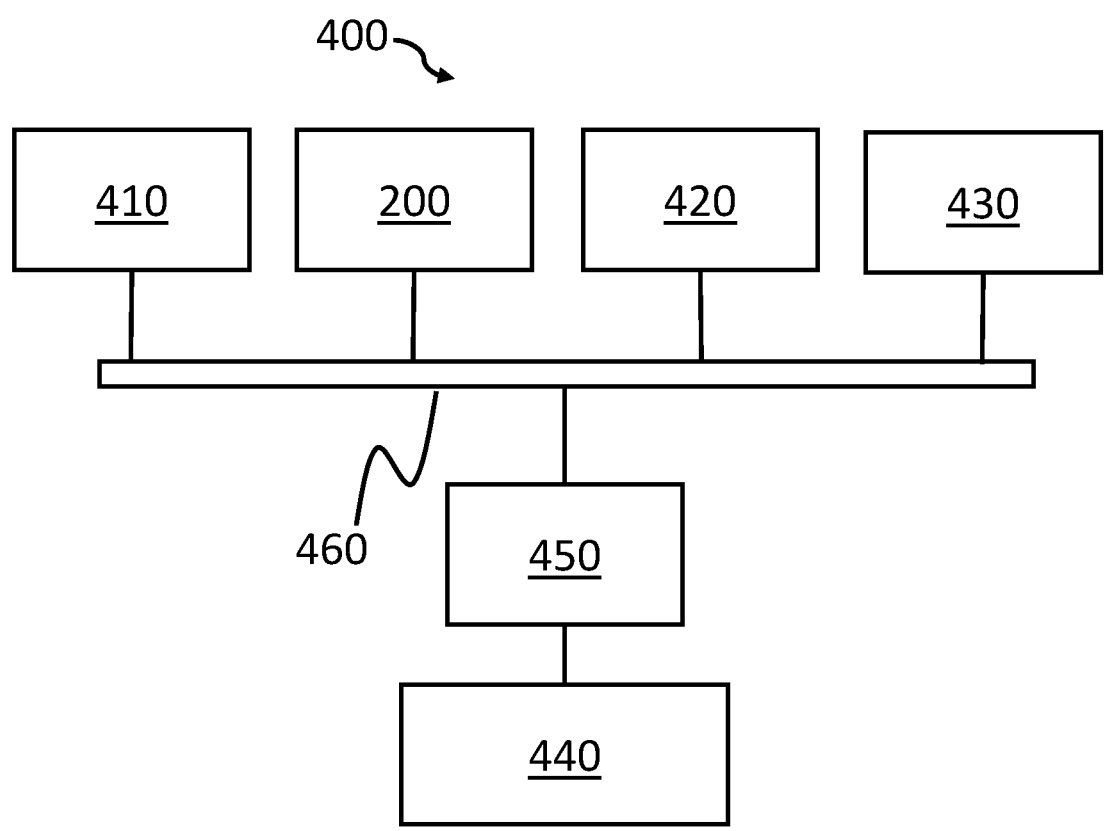
FIG. 4 shows schematically a system comprising features according to examples.

FIG. 4 shows schematically a system 400 comprising features according to examples using an image processor, such as the image processor 100, 200 described above in relation to FIGS. 1 and 2 and one or more other processors 420.

The system 400 comprises an image sensor 410, such as a camera arranged to capture visual data associated with a real-world environment representative of the environment in which the system is located. For example, the system may form part of a mobile computing device, such as a mobile telephone or wearable device, with a camera, wherein the camera is arranged to capture visual data about the location of the mobile computing device.

The image sensor 410 is communicably coupled to an ISP 200, such as the ISPs 100, 200 described above in relation to FIGS. 1 and 2. The ISP 200, as described above, is arranged to process the image data captured by the image sensor 410, which may be temporarily stored on internal memory within the ISP 200. The ISP 200 is arranged to generate one or more data points, such as keypoint positions, key point detector responses, keypoint descriptors, motion vectors for at least one key point, and a matching score.

The system 400 also comprises one or more additional processors 420 such as a central processing unit, a graphics processing unit, or a dedicated simultaneous localization and mapping solver. The one or more other processors 420, and the ISP 200 may be combined as a SoC or onto multiple SoCs to form one or more application processors.

The one or more other processors 420 may be arranged to receive further input from additional sensors 430 arranged to measure other characteristics and features of the real-world environment. For example, the additional sensors may be any one of an optical sensor, such as a laser range finder, Sonar, or LiDAR system; an accelerometer or other motion detection sensors; a location positioning sensor, such as a global or local positioning system sensor, GLONASS, Galileo, or indoor positioning system; and/or a wireless connectivity module such as Wi-Fi and/or Bluetooth® sensor capable of determining the position of a device relative to one or more access points. It will be appreciated that any number and/or type of sensor in combination may be connected to the one or more other processors 420. The one or more additional sensors 430 may form part of an IMU. The one or more other processors are arranged to process the inputs received from those sensors and in some examples provide the input to the IPS 200 as feedback data for use when generating the data points.

The system 400 also comprises memory 440 for storing at least the data points generated by the ISP 200 and is accessed via a memory controller 450. The memory may also be arranged to store other information for use by the system 400 for use by the ISP 200 or any of the other processors 430. For example, the memory 440 may be arranged to store information relating to previously detected data points, such that the one or more other processors 420 can read that information and use it in combination with the input from the sensors 430 to refine and/or update the data points generated by the ISP 200.

The memory controller 450 may comprise a dynamic memory controller (DMC). The memory controller 450 is coupled to the memory 440. The memory controller 450 is configured to manage the flow of data going to and from the memory 440. The memory 440 may comprise a main memory, otherwise referred to as a 'primary memory'. The memory 440 may be an external memory, in that the memory 440 is external to the system 400. For example, the memory 440 may comprise 'off-chip' memory. The memory 440 may have a greater storage capacity than the memory cache(s) of the ISP 200 and/or other processors 420. In some examples, the memory 440 is comprised in the system 400. For example, the memory 440 may comprise 'on-chip' memory. The memory 440 may, for example, comprise a magnetic or optical disk and disk drive or a solid-state drive (SSD). In some examples, the memory 440 comprises a synchronous dynamic random-access memory (SDRAM). For example, the memory 440 may comprise a double data rate synchronous dynamic random-access memory (DDR-SDRAM). The memory 440 may be arranged to store image data received as an output from the ISP 200. The stored image data may correspond to successive images in a video stream. The memory 440 may comprise a frame buffer arranged to store the image data.

One or more of the ISP 200, the at least one other processor 420, and the memory controller 450, the camera 410, and the one or more other sensors 430 may be interconnected, for example using system bus 460, although it will be appreciated that the ISP 200 and at least one of the other components 410, 420, 430, 450 of the system 400 may be directly connected to one another such that the output of one component is connected directly to the input of another component in a pipeline. This allows data to be transferred between the various components. The system bus 460 may be or include any suitable interface or bus. For example, an ARM® Advanced Microcontroller Bus Architecture (AMBA®) interface, such as the Advanced eXtensible Interface (AXI), may be used.

The above examples are to be understood as illustrative examples of the present disclosure. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. An image signal processor, comprising:
    an input module for obtaining input data from a camera, the camera arranged to capture a representation of a real-world environment;
    at least one compression module for compressing the input data and producing compressed input data, wherein the compressed input data is smaller than the input data;
    a delay module for buffering the compressed input data produced by the at least one compression module;
    a combination module for producing combined input data by combining a plurality of compressed input data buffered by the delay module;
    a localization and mapping module arranged to generate one or more data points from the combined input data; and
    an output module for outputting at least the one or more data points.

2. The image signal processor of claim 1, wherein a first compression module is arranged to produce compressed input data at a first compression rate, and a second compression module is arranged to produce compressed input data at a second compression rate.

3. The image signal processor of claim 2, wherein the first compression rate is applied to a first portion of the input data, and the second compression rate is applied to a second portion of the input data.

4. The image signal processor of claim 1, wherein each compression module is arranged to compress at least a portion of the input data.

5. The image signal processor of claim 1 where the compression module is arranged to apply to the input data at least one of a:
    scaling operation; and
    an interpolation operation.

6. The image signal processor of claim 1, wherein the input module is further arranged to receive feedback data from a processor.

7. The image signal processor of claim 6, wherein the localization and mapping module generates the one or more data points based on the combined input data and the feedback data.

8. The image signal processor of claim 6, wherein the feedback data comprises at least one of:
    one or more predicted locations of previously detected key points
    a variance or other measure for predicted locations;
    one or more points of interest; and
    metadata associated with one or more key points.

9. The image signal processor of claim 1, wherein the output module is further arranged to output the image data.

10. The image signal processor of claim 1, wherein the data points comprises at least one of:
    a key point position;
    a key point detector response;
    a key point descriptor;
    a motion vector associated with at least one key point; and
    a matching score.

11. A system comprising:
    a sensor for capturing a representation of a real-world environment;
    an image signal processor according to claim 1 arranged to receive the representation from the camera and generate one or more data points; and
    a processor.

12. The system of claim 11, further comprising one or more sensors associated with the processor, the one or more sensors comprising at least one of:
    an optical sensor;
    an accelerometer;
    a location positioning sensor; and
    a wireless connectivity module.

13. A method for localization and mapping of a real-world environment, the method comprising the steps of:
    obtaining input data from a camera, the camera arranged to capture a representation of the real-world environment;
    compressing the input data to produce compressed input data, wherein the compressed input data is smaller than the input data;
    buffering the compressed input data;
    combining a plurality of the buffered compressed input data to produce combined input data;
    generating one or more data points from the combined input data; and
    outputting at least the one or more data points.

14. The method of claim 13, wherein compressing the input data comprises compressing the input data at a first compression rate and compressing the input data at a second compression rate.

15. The method of claim 14, wherein the first compression rate is applied to a first portion of the input data and a second compression rate is applied to a second portion of the input data.

16. The method of claim 14, wherein the step of combining the plurality of the buffered compressed input data comprises combining at least the input data compressed at a first compression rate, and the input data compressed at the second compression rate.

17. The method of claim 13, where compressing the input data comprises applying, to the input data, at least one of a:
    scaling operation; and
    an interpolation operation.

18. The method of claim 13, further comprising obtaining feedback data for a processor and generating the one or more data points based on the combined input data and feedback data.

19. The method of claim 13, further comprising outputting the input data obtained from the camera.

* * * * *